Figure 1:
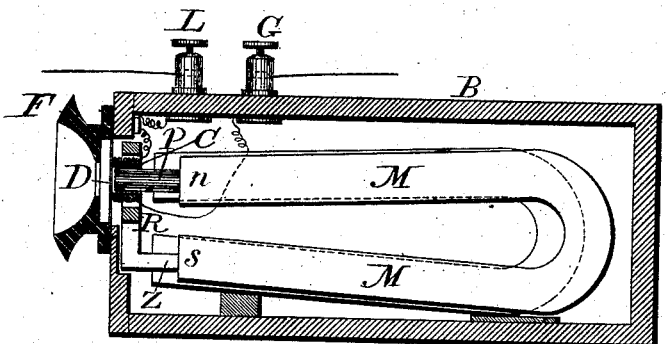
Figure 2:
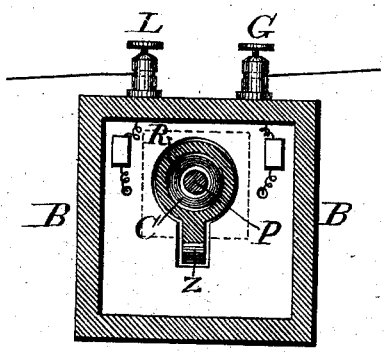
Figure 3:

C. CUTTRISS & J. REDDING.
Telephone.

No. 242,816.                    Patented June 14, 1881.

Witnesses

Chas. A. Perry.
Miller C. Earl

Inventors;

Charles Cuttriss,
Jerome Redding by their Attorney,
Frank L. Pope

UNITED STATES PATENT OFFICE.

CHARLES CUTTRISS, OF DUXBURY, AND JEROME REDDING, OF BOSTON, ASSIGNORS TO JAMES WENTWORTH BROWN AND HENRY D. HYDE, BOTH OF BOSTON, MASSACHUSETTS.

TELEPHONE.

SPECIFICATION forming part of Letters Patent No. 242,816, dated June 14, 1881.

Application filed November 28, 1877.

*To all whom it may concern:*

Be it known that we, CHARLES CUTTRISS, a subject of the Queen of Great Britain, at present residing in Duxbury, in the county of Plymouth and State of Massachusetts, and JEROME REDDING, a citizen of the United States, residing in Boston, in the county of Suffolk and State of Massachusetts, have jointly invented a new and useful Improvement in Speaking-Telephones, of which the following is a specification.

Our invention relates to a certain class of apparatus known as "telephones," which are designed to transmit and reproduce at a distance sonorous waves or vibrations of any description representing sounds by means of electrical impulses. Such an apparatus consists, generally speaking, of an elastic vibrating plate or tympanum, which is combined with a small magneto-electric generator in such a manner that the said tympanum is not only capable of responding to sonorous vibrations traversing the atmosphere, but at the same time of generating a correlated series of magneto-electric waves or pulsations, which are made to pass through a suitable conductor and to act in the reverse manner upon an apparatus situated at a receiving station or stations, which apparatus is in its construction precisely similar to that hereinbefore referred to—that is to say, the pulsations traverse the helices or coils of the apparatus, producing what may be termed "electro-magnetic pulsations or waves," by the action of which the elastic plate or tympanum is thrown into mechanical vibrations, which are in every essential respect the counterpart of the simultaneous vibrations of the corresponding plate at the sending-station. These vibrations of the tympanum, being communicated through the medium of the air to the ear of a listener, produce an effect which is similar to that which would have been produced by the original vibrations at the transmitting-station.

Our invention relates particularly to a novel construction and arrangement of the vibrating plate or tympanum and the inducing coil or helix with reference to the permanent magnet, whereby the intensity of the magneto-electric current produced by a given amplitude of vibration in the tympanum is materially increased.

It consists, specifically, in the combination of a tympanum or plate rigidly supported at its edges, but free to vibrate at its center, with a hollow cylindrical coil or helix of insulated wire mounted axially upon or affixed to said tympanum, whereby the said coil may be thrown into vibration by the impact of sonorous vibrations traversing the atmosphere; or, conversely, the coil may be made to throw the tympanum into vibration and thereby create sonorous waves in the atmosphere.

The invention further consists in the combination of a tympanum or plate capable of being thrown into vibration, with a hollow cylindrical helix of insulated wire mounted axially thereupon, and a stationary permanent magnet, whereby the mechanical vibrations imparted to the coil by the tympanum, in consequence of the movement of the coil to and fro through the field-of-force of the said permanent magnet, generate magneto-electric vibrations or undulations, which may be conveyed by a conductor to a distant point; or, conversely, the passage of such electrical vibrations through the coil thus situated within the field-of-force of the permanent magnet will throw the said coil into mechanical vibrations, which will be imparted to the tympanum, and from thence to the surrounding atmosphere.

In the accompanying drawings, Figure I is a vertical longitudinal section of a speaking-telephone apparatus embodying our improvements. Fig. II is a transverse section of the same; and Fig. III is a detached view, showing a portion of the apparatus in perspective.

The complete apparatus, when organized for oral or other communication between two points more or less distant from each other, consists of two instruments similar to each other in all respects, one of which is situated at each of the terminal stations. The two instruments are connected by an insulated conductor extending from one to the other. The return-conductor for completing the circuit may consist of another similar insulated wire, or the circuit may be completed by or through the earth in a well-known manner.

In the drawings, M M represents a permanent magnet of any suitable construction, which is secured to the inside of the box or case B B in any convenient manner. The magnet M M is preferably a compound magnet built up of a number of independent plates separately magnetized and afterward combined together. To one pole of the magnet M—for example, the north pole, N—is affixed or inserted a cylindrical pole-piece, P, preferably of soft iron, while to the south pole, S, is affixed another pole-piece, R, of a form best seen in the detached perspective view, Fig. III. It consists, essentially, of a hollow cylinder or ring provided with an angular projection, as seen at Z, by which it is attached to the pole of the magnet M. The diameter of the circular aperture within the ring is considerably greater than that of the cylindrical pole-piece P, so that the former will encircle the latter when the parts have been placed in position, leaving an annular space between the cylinder and the ring. By thus causing the actual south pole of the magnet M to completely encircle the cylinder which forms the north pole nearly the whole of the magnetic energy is concentrated within a very narrow field.

The vibrating plate, tympanum, or diaphragm D may be of thin brass, or of any metal that will by virtue of its elasticity or sonorous qualities be most effectually thrown into vibration by vocal or other sounds produced in its vicinity. It is not essential that it should be constructed of metal, inductive or otherwise, as parchment or any membrane that is suitable in other respects may be employed.

C is a hollow cylindrical coil or helix of thin insulated copper wire, which is mounted upon or firmly attached to the center of the tympanum D, the axis of the coil being coincident with the axis of the diaphragm and also with the axis of the cylindrical pole-piece P. This coil is constructed of such external and internal diameter that it will be capable of vibrating to and fro in a direction parallel to its axis within the annular space left between the inner and outer pole-pieces, P and R. By this arrangement, whenever the coil C is caused to move to and fro by the vibration of the diaphragm or tympanum D, to which it is attached, its convolutions cross the lines of magnetic force nearly at right angles, thereby producing in the coil a magneto-electric current of maximum strength. The arrangement of the coil C with reference to the vibrating plate or tympanum D and the permanently magnetized pole-pieces P and R permits perfect freedom of motion to the coil. The relative dimensions of the plate and the coil may be varied in accordance with the requirements of practical use. The proper distance of the magnet from the plate having been ascertained by experiment, the magnet is permanently secured in position within the box R, and no further adjustment will thereafter be required.

The pole-pieces P and R may be forged, with the magnet, from one bar of steel, if desired, but it is considered preferable to construct them separately, as hereinbefore described.

The sounds which are designed to be transmitted and reproduced at the distant station by means of the apparatus enter the mouth-piece or funnel F, and cause responsive vibrations of the plate D and its attached coil C. The movements of the coil to and fro across the intense magnetic field between the two poles of the permanent magnet generate corresponding currents of magneto-electricity in the wire of the coil, which flow to the binding-screw L, to which is attached the line-wire leading to the distant station. The currents pass from the line through the coil of the corresponding instrument at the distant station, which is therefore thrown into synchronous and correlated vibrations. The current goes to the earth or to the return-wire, coming back to the binding-screw G, and thence to the other terminal of the coil C. The alternate attraction and repulsion between the permanent magnet and the currents traversing the coil in the receiving-instrument causes a vibratory motion of the coil, which is communicated to the plate upon which the latter is mounted, and thence to the air, thus producing sounds.

We do not desire to confine ourselves to the use of a single coil and magnet, as more than one may be used in connection with the same vibrating plate.

We claim as our invention—

1. The combination, substantially as hereinbefore set forth, of a tympanum or plate rigidly supported at its edges, but free to vibrate at its center, with a hollow cylindrical helix of insulated wire mounted axially upon or affixed to said tympanum.

2. The combination, substantially as hereinbefore set forth, of a tympanum or plate capable of being thrown into vibration, with a hollow cylindrical helix of insulated wire mounted axially thereupon, and a stationary permanent magnet.

CHARLES CUTTRISS. [L. S.]
JEROME REDDING. [L. S.]

In presence of—
GEORGE F. MILLIKEN,
JOHN M. BATCHELDER.